(12) United States Patent
Pakravan et al.

(10) Patent No.: US 7,738,757 B1
(45) Date of Patent: Jun. 15, 2010

(54) OPTICAL CONNECTION ADAPTORS FOR A DATA COMMUNICATIONS DEVICE AND METHODS OF USE

(75) Inventors: Farhad Pakravan, Los Altos, CA (US);
John B. Levy, Los Altos, CA (US);
John Kelly, Sunnyvale, CA (US);
Marvin Milock, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 888 days.

(21) Appl. No.: 11/323,815

(22) Filed: Dec. 30, 2005

(51) Int. Cl.
*G02B 6/00* (2006.01)
*H04L 12/28* (2006.01)

(52) U.S. Cl. .................. 385/135; 385/147; 370/351

(58) Field of Classification Search .............. 385/134, 385/135, 136, 137, 147; 370/351, 357, 386, 370/465
See application file for complete search history.

(56) References Cited

U.S. PATENT DOCUMENTS

| | | | |
|---|---|---|---|
| 6,362,908 B1 | 3/2002 | Kimbrough et al. | 398/164 |
| 6,366,464 B1 * | 4/2002 | Cosley et al. | 361/752 |
| 6,711,022 B2 | 3/2004 | Frederick et al. | 361/728 |
| 6,761,487 B2 | 7/2004 | Doyle | 385/53 |
| 7,277,425 B1 * | 10/2007 | Sikdar | 370/366 |
| 7,406,038 B1 * | 7/2008 | Oelke et al. | 370/225 |
| 7,421,509 B2 * | 9/2008 | Lolayekar et al. | 709/235 |
| 7,453,870 B2 * | 11/2008 | Alappat et al. | 370/360 |
| 7,492,705 B1 * | 2/2009 | Toman et al. | 370/217 |
| 2004/0228634 A1 * | 11/2004 | Fricker | 398/135 |
| 2006/0018260 A1 * | 1/2006 | Richmond et al. | 370/236.2 |

OTHER PUBLICATIONS

Cisco Systems, "Cisco Carrier Routing System", Feb. 2006.
Cisco Systems, "Cisco CrS-1 24-Slot Fabric-Card Chassis", 2005, pp. 1-6.

* cited by examiner

*Primary Examiner*—Uyen-Chau N Le
*Assistant Examiner*—John M Bedtelyon
(74) *Attorney, Agent, or Firm*—BainwoodHuang

(57) ABSTRACT

A data communications system includes optic adaptors that provide an interface between multiple line card chassis and a fabric card chassis. Optic adaptors can be added to the system to allow the addition of a number of line card chassis, thereby increasing the overall bandwidth of the system. The optic adaptors can also be separated from the fabric card chassis and line card chassis and upgraded to allow an increase in the overall bandwidth of the system. For example, optic adaptors that provide optical connections between a first number of line card chassis and the fabric card chassis can be detached from both the fabric card chassis and the respective line card chassis. Optic adaptors that provide optical connections between the fabric card chassis and a second, increased number of line card chassis are then installed within the fabric card chassis thereby allowing the additional line card chassis to be connected to the fabric card chassis.

10 Claims, 15 Drawing Sheets

OPTICAL CONNECTION ADAPTORS FOR A DATA COMMUNICATIONS DEVICE AND METHODS OF USE

BACKGROUND

Conventional networks typically include data communications devices that transmit data packets from one or more sources to one or more destinations. Certain data communications devices, such as routers, receive packets containing data and control information at input ports, and, based on destination or other information included in the packets, route the packets to appropriate output ports that lead to either another router or to the packet's final destination.

Routers can be configured as having various sizes and capacities based upon their intended use. For example, low capacity routers are typically used in home networks to route data among three or four personal computers. High-performance routers, commonly used by enterprises such as telecommunication companies and Internet service providers, provide relatively high bandwidth packet routing and can process packets for many thousands of different end users.

High-performance routers can be complex devices that include multiple processors and other circuitry integrated into a single physical box. For example, a high-performance router can include physical interface cards, adaptors for holding the physical interface cards, a routing engine, and switching and forwarding adaptors. Each one of these components can be implemented on a separate circuit board controlled by one or more processors. These circuit boards can then be mounted in a single physical chassis to form the router.

SUMMARY

While conventional high-performance routers provide relatively high bandwidth packet routing, over time, bandwidth demands on these routers can increase, such as caused by an increase in the number of users or an increase in the number of packets required to be processed by the routers over a given time. In order to upgrade the bandwidth provided to its customers, enterprises typically utilize multiple high performance routers to service its customers.

The use of multiple high performance routers, however, suffers from a variety of deficiencies. For example, when the enterprise uses multiple high-performance routers to service their clients, the routers are typically configured as stand alone devices having fixed bandwidth connections. As such, each router within the enterprise has no communication or interconnection with the enterprise's other routers. As such, packets received on one of the enterprise's routers cannot be delivered to a destination via another of the enterprise's routers.

In order to provide communication between multiple routers, the enterprise can serially interconnect the routers. For example in order to connect two high-performance routers together, the enterprise can directly connect a data port on one router with a data port on another such that the ports are dedicated to transmitting data between the two devices. The dedicated, interconnected ports, however, cannot be used to receive data from or transmit data to locations external to the enterprise. As a result, with fewer ports available to either router for data transmission, the overall performance of both routers is reduced. Also, the direct connection between the two routers adds a layer of latency to data transmissions that enter the enterprise through one port on a first router and that exit the enterprise through another port on a second, interconnected router.

By contrast, embodiments of the present invention relate to a data communications system that allows interconnection of multiple line card chassis to an expandable fabric card chassis which, together, act as a single, functional data communications device. The data communications system includes optic adaptors that provide an interface between multiple line card chassis and the fabric card chassis, thereby allowing data transfer among the line card chassis. Additionally, the optic adaptors provide a level of scalability to the system. For example, optic adaptors can be added to the fabric card chassis allow the addition of a number of line card chassis to the system, thereby increasing the overall bandwidth of the system without requiring a dedication of communication ports among line card chassis for intercommunication. The optic adaptors can also be upgraded within the system to allow an increase in the overall bandwidth of the system. For example, optic adaptors that provide optical connections between a certain number of line card chassis and the fabric card chassis can be detached from both the fabric card chassis and the respective line card chassis. Optic adaptors that provide optical connections between the fabric card chassis and a second, increased number of line card chassis are then installed within the fabric card chassis, thereby allowing the additional line card chassis to be connected to the fabric card chassis.

One embodiment of the invention relates to a method for interconnecting a plurality of line card chassis of a data communications system where the plurality of line card chassis are configured to transmit and receive data via a network. The method includes providing a fabric card chassis having a plurality of fabric planes, each fabric plane having a first fabric card and a first optic adaptor optically coupled to the first fabric card and optically coupling, to each fabric plane of the fabric card chassis, at least a second fabric card and a second optic adaptor optically coupled to the second fabric card. The method also includes optically coupling a plurality of line card chassis to the fabric card chassis such that (i) each first optic adaptor of each fabric plane is operable to carry a signal between its associated fabric card and a line card of a corresponding plane of any of the plurality of line card chassis and (ii) each at least a second optic adaptor of each fabric plane is operable to carry a signal between its associated fabric card and a line card of a corresponding plane of any the plurality of line card chassis. The method allows adding line card chassis to a data communications network to increase the network's the bandwidth without requiring a dedication of communication ports among line card chassis for intercommunication.

One embodiment of the invention relates to a method for interconnecting line card chassis of a data communications system. The method includes providing a fabric card chassis having a fabric card and a first optic adaptor optically coupled to the fabric card, the first optic adaptor having a first set of pathways configured to carry a signal between the fabric card and each line card chassis of a first plurality of line card chassis. The method also includes optically decoupling the first optic adaptor from the fabric card and optically coupling a second optic adaptor to at least two fabric cards of the fabric card chassis, the second optic adaptor having a second set of pathways configured to carry a signal between the at least two fabric cards and any line card chassis of the first plurality of line card chassis and any line card chassis of a second plurality of line card chassis. The method allows adding line card chassis to a data communications network to increase the network's the bandwidth without requiring a dedication of communication ports among line card chassis for intercommunication.

In one arrangement, the method includes providing the fabric card chassis having a plurality of fabric planes, each fabric plane having a first fabric card and a first optic adaptor optically coupled to the first fabric card, each of the first optic adaptors having a set of pathways configured to carry a signal between each of the fabric planes of the fabric card chassis and corresponding fabric planes of each line card chassis of the first plurality of line card chassis. The method also includes optically decoupling the first optic adaptor from the fabric card in one of the plurality of fabric planes of the fabric chassis while maintaining the optical connection between the first optic adaptors and the fabric cards in the remaining plurality of fabric'planes. Such a method allows the fabric card chassis to be upgraded during operation so that the system provides substantially continuous service to end user devices during the upgrade procedure.

In one arrangement, a data communications system includes a fabric card chassis having at least one fabric card, a plurality of line card chassis, and an optic adaptor having a first set of optical connectors optically coupled to the at least one fabric card of the fabric card chassis, a second set of optical connectors optically coupled to the plurality of line card chassis, and an optic pathway disposed between the first set of optical connectors and the second set of optical connectors. The optic adaptor is configured to (i) to direct a signal from one of the plurality of line card chassis to the at least one fabric card and (ii) to direct a signal from the at least one fabric card to any of the plurality of line card chassis connected to the optic adaptor.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Embodiments of the present invention relate to a data communications system that allows interconnection of multiple line card chassis to an expandable fabric card chassis which, together, act as a single, functional data communications device. The data communications system includes optic adaptors that provide an interface between multiple line card chassis and the fabric card chassis, thereby allowing data transfer among the line card chassis. Additionally, the optic adaptors provide a level of scalability to the system. For example, optic adaptors can be added to the fabric card chassis allow the addition of a number of line card chassis to the system, thereby increasing the overall bandwidth of the system without requiring a dedication of communication ports among line card chassis for intercommunication. The optic adaptors can also be upgraded within the system to allow an increase in the overall bandwidth of the system. For example, optic adaptors that provide optical connections between a first number of line card chassis and the fabric card chassis can be detached from both the fabric card chassis and the respective line card chassis. Optic adaptors that provide optical connections between the fabric card chassis and a second, increased number of line card chassis are then installed within the fabric card chassis thereby allowing the additional line card chassis to be connected to the fabric card chassis.

Figure 1:
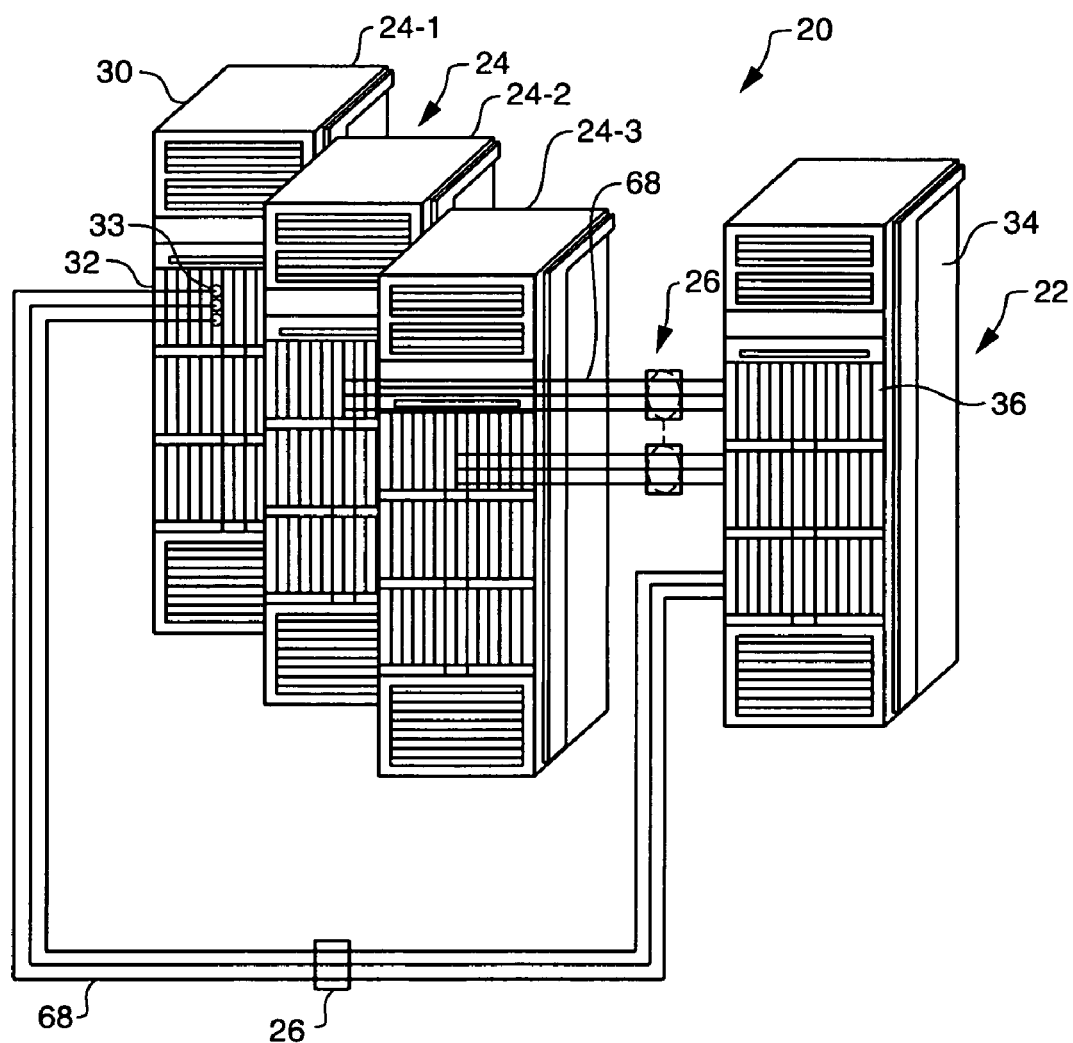
FIG. 1 illustrates a data communications system that includes multiple line card chassis, a fabric card chassis, and an optic adaptor optically coupling the line card chassis and the fabric card chassis.

FIG. 1 shows a data communications system 20 that is suitable for use by embodiments of the invention. The data communications system 20 includes a fabric card chassis 22, multiple line card chassis 24, and optic adaptors 26 that provide an interconnection between the line card chassis 24 and the fabric card chassis 22. During operation, the data communications system 20 receives packets from a user device via a network, such as the Internet. Based on information included in the packets, the data communications system 20 delivers the packets to an appropriate destination. In particular, as one line card chassis 24-1 in the system 20 receives packets from one user device, the system 20 allows the packets to be routed to other user devices though any line card chassis 24-1, 24-2, 24-3 of the system 20.

Each line card chassis 24 includes a housing 30 having multiple line cards 32 where each line card 32 is configured to receive and transmit packets to end user devices connected to the system 20. For example, each line card 32 includes an upper and lower first-stage Application-Specific Integrated Circuit (ASIC) that receives data from the a user device and transmits data to the fabric card chassis 22. Each line card 32 also includes two upper and lower third-stage ASICs configured to receive data from the fabric card chassis 22. While the line card chassis 24 can be configured with any number of line cards 32, in one embodiment, each line card chassis 24 includes up to eight line cards 32 where each one of the eight line cards 32 represents one of eight fabric planes associated with the line card chassis 24.

The line cards 32 of each plane connect to corresponding planes in the fabric card chassis 22 by way of line card connectors 33. Each line card connector 33 allows fiber optic coupling, such as by optic cable 68, between the line cards 32 and the fabric card chassis 22. In one arrangement, each line card 32 includes three line card connectors 33 configured to couple to the fabric card chassis 22. For example, each first-stage ASIC of each line card 32 has thirty-six fiber optic outputs where every twelve outputs connects to a parallel optic device (POD). Also, each third-stage ASIC has thirty-six fiber optic inputs where every twelve inputs connect to a POD. With such a configuration, each line card 32 includes a total of 18 PODs per card 32 (e.g., three transmission upper PODs, three transmission lower PODs, six receiving upper PODs, and six receiving lower PODs). The PODs on each fabric card 32 are connected to the three line card connectors 33 on the card 32 by a fiber ribbon cable where each fiber represents an optical channel from the POD's to the line card connectors 33.

Figure 2:
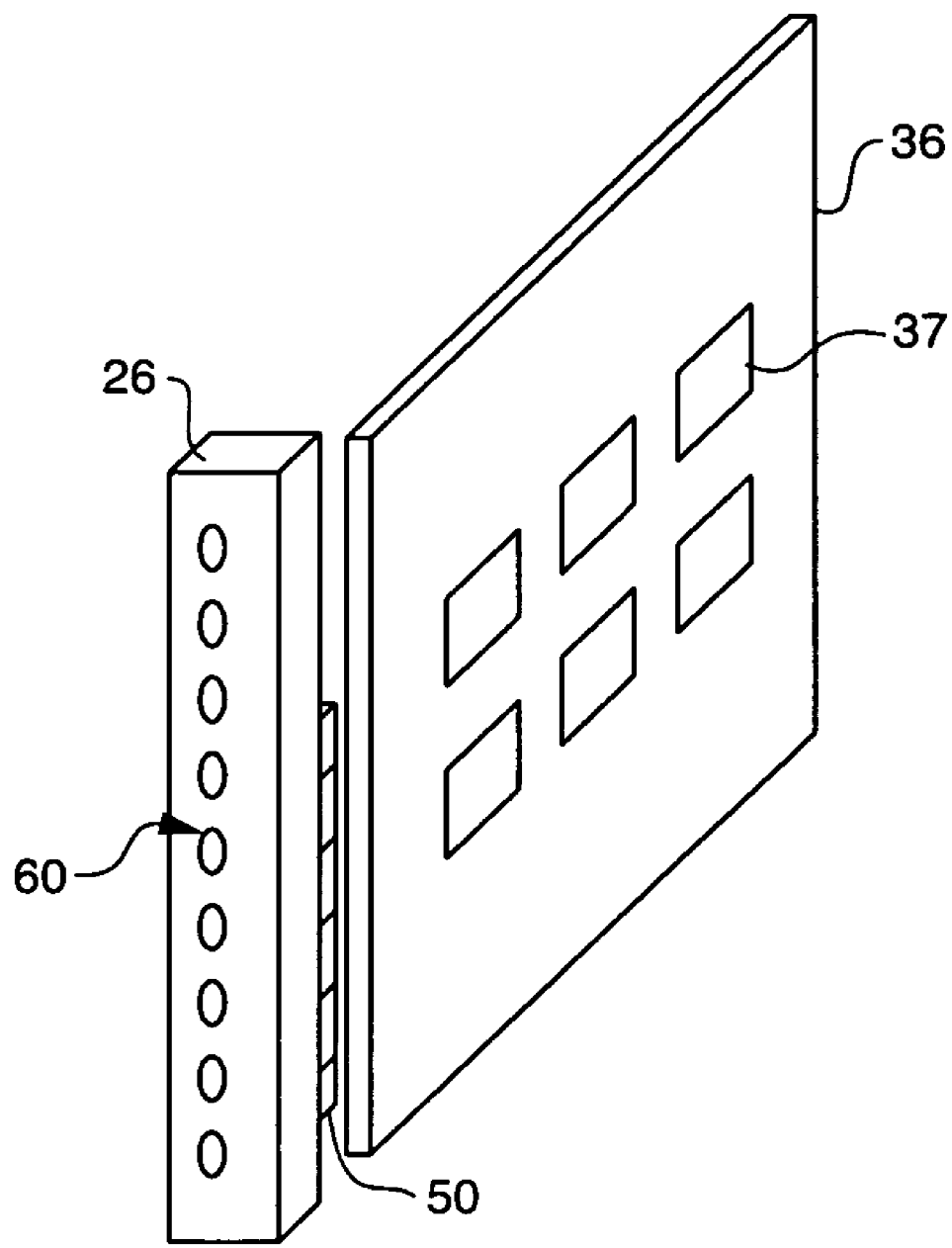
FIG. 2 illustrates a perspective view of the optic adaptor and fabric card of FIG. 1, according to one embodiment of the invention.

The fabric card chassis 22 includes a housing 34 having multiple fabric cards 36. Each fabric card 36 in the fabric card chassis 22 represent a plane in the fabric card chassis 22. In one embodiment, the fabric card chassis 22 includes eight fabric cards 36 that allow interconnection of up to three line card chassis 24-1, 24-2, 24-3 per fabric card. However, the fabric card chassis 22 can be expanded to include additional fabric cards 36, up to twenty-four fabric cards 36 for example, as the number of line card chassis 24 within the system 20 increases. The fabric cards 36 are configured to receive packets or data from any of the line card chassis 24, detect the appropriate destination of the data, and direct the data to the appropriate line card chassis 24. For example, in one arrangement as shown in FIG. 2, each fabric card 36 of the fabric card chassis 22 includes six second-stage ASICs 37 that receive data from the first stage ASICs of a line card 32 and direct the data to one or more third-stage ASICs on one or more interconnected line cards 32 of the system 20.

Figure 3B:
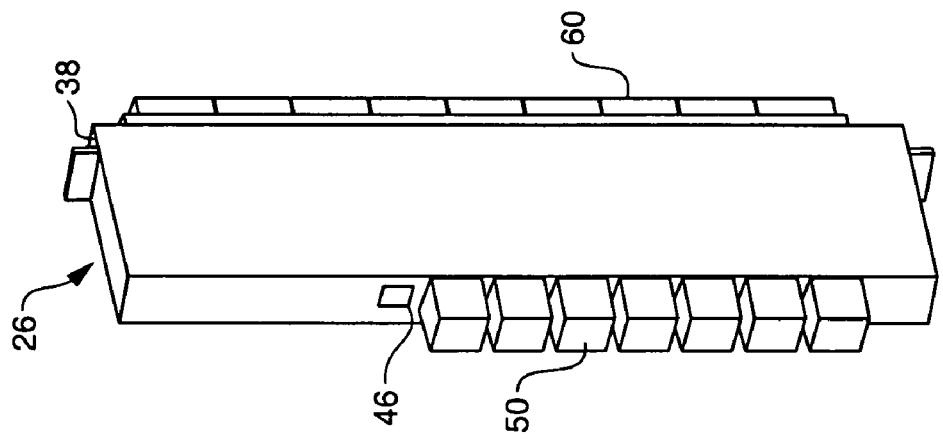
FIG. 3B illustrates a rear perspective view of the optic adaptor of FIG. 3A.
Figure 3A:
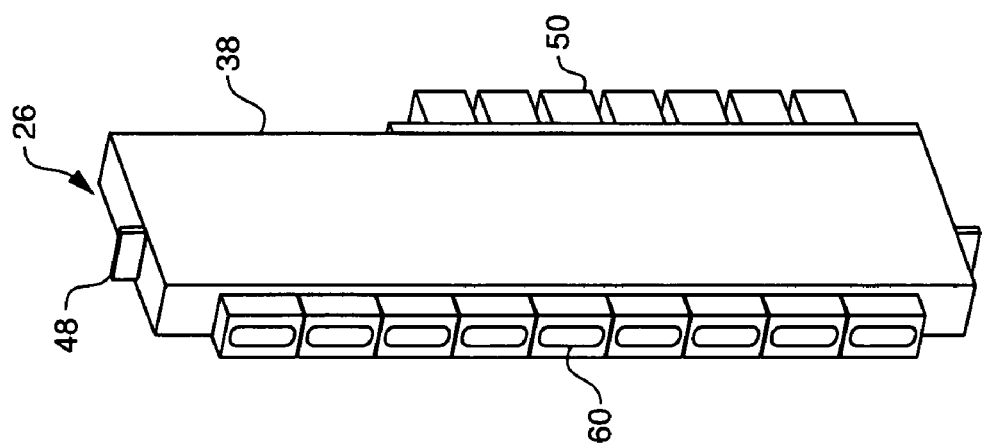
FIG. 3A illustrates a front perspective view of an embodiment of an optic adaptor of FIG. 1, according to one embodiment of the invention.
Figure 4:
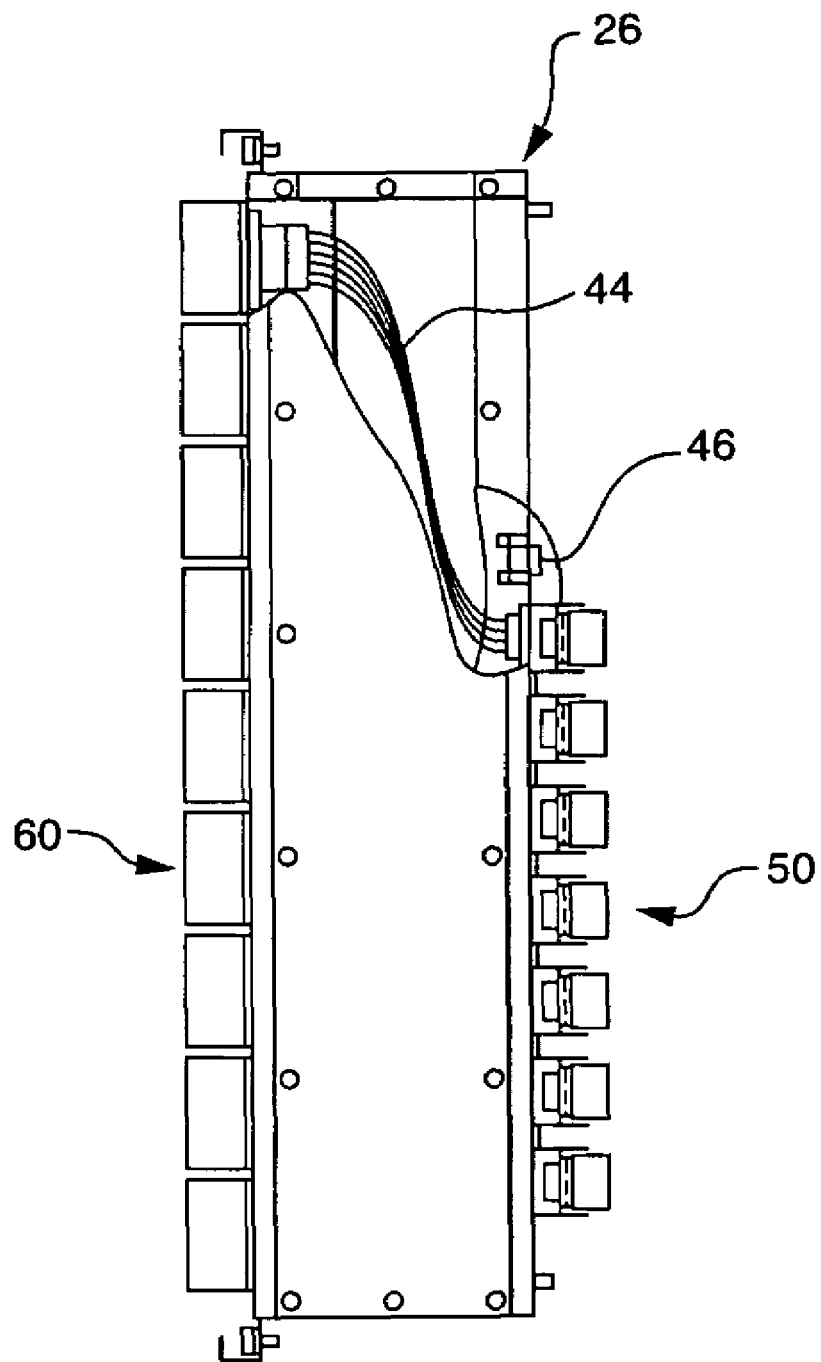
FIG. 4 illustrates a side, sectional view of the optic adaptor of FIG. 3A.

The optic adaptors 26 optically couple the line cards 32 of the line card chassis 24 to the fabric cards 36 of the fabric card chassis 22, thereby facilitating data transfer within the system 20. FIGS. 2-4 illustrate one embodiment of an optic adaptor 26 having a housing 38, fabric card connectors 50, line card connectors 60, and an optic coupling 44 disposed between the fabric card and line card connectors 50, 60.

The housing 38 is configured to secure the first and second sets of connectors 50, 60 together. In one arrangement, as shown, the housing 38 is configured as a "single-space" housing configured to be inserted within a single rack space within the fabric card chassis 22. As such, the housing 38 allows coupling of the optic adaptors 26 with a corresponding fabric card 36 of the fabric card chassis 22.

Figure 5B:
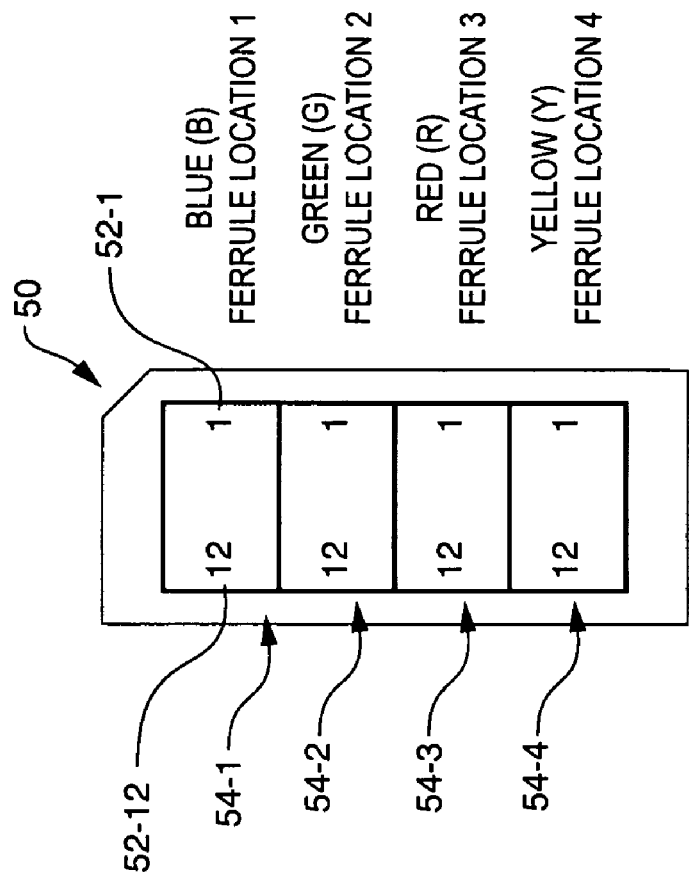
FIG. 5B illustrates an end view of the fabric card connector of FIG. 5A.

The fabric card or ferrule connectors 50 optically couple the optic adaptor 26 to a corresponding fabric card 36 in the fabric card chassis 22. For example, in the arrangement illustrated in FIGS. 5A and 5B, each connector 50 is configured as an HBMT Mother Board connector (HBMT MB) 50 having ferrules 52 that contain a number of optic fibers 52. In the embodiment shown in FIGS. 3B and 5B, the optic adaptor 26 includes fourteen HBMT MB connectors 50, where each connector 50 includes four ferrules 54-1 through 54-4 where each ferrule contains twelve optic fibers 52-1 through 52-12. In use, each of the fabric card connectors 50 blind mounts with one or more fabric cards 36 of the fabric card chassis 22. For example, as the optic adaptor 26 is inserted within the fabric card chassis 22, the fabric card connectors 50 engage and optically couple with corresponding receptacles, such as HBMT Mother Board receptacles, mounted on the fabric cards 36.

Figure 5A:
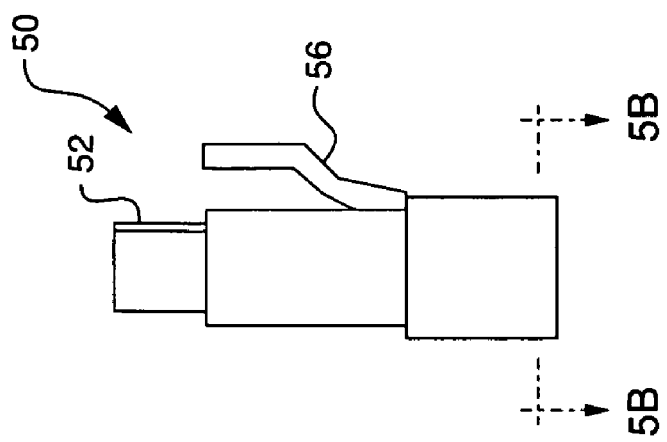
FIG. 5A illustrates a side view of a fabric card connector of the optic adaptor, according to one embodiment of the invention.

In one arrangement, as shown in FIG. 5A, each connector 50 includes a latch mechanism 56 that allows the optic adaptor 26 to removeably couple to the fabric cards 36 of the fabric card chassis 22. For example, when the fabric card connectors 50 blind mount with a fabric card 36 the latch mechanism 56 of each connector 50 engages the corresponding fabric card receptacle to secure to the optic adaptor 26 to the fabric card 36. To detach the optic adaptor 26 from the fabric card 36, such as to upgrade the optic adaptor 26 to connect additional line card chassis 24 to the fabric card chassis 22, a user depresses the latch mechanism 56 for each connector 50 to release each connector 50 from each corresponding line card receptacle and to remove the optic adaptor 26 from the fabric card 36.

Figure 6B:
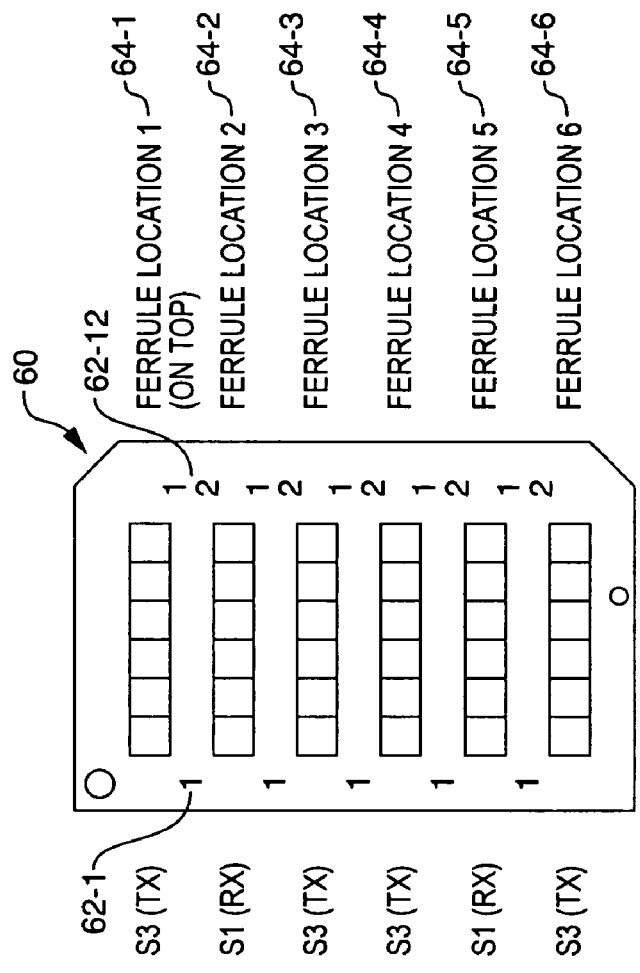
FIG. 6B illustrates an end view of the line card connector of FIG. 6A.
Figure 6A:
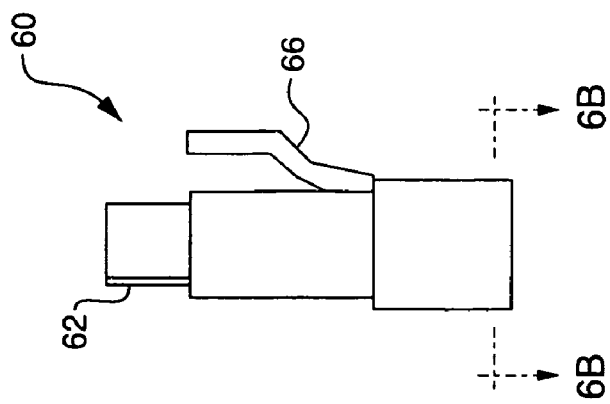
FIG. 6A illustrates a side view of a line card connector of the optic adaptor, according to one embodiment of the invention.

The line card or ferrule connectors 60 optically couple the optic adaptor 26 to one or more line card chassis 24 within the system 20. In one arrangement, as shown in FIG. 6A, each connector 60 includes a latch mechanism 66 that allows the optic adaptor 26 to removeably couple to line cards 32 of the line card chassis 20. In one arrangement, each connector 60 is configured as a Bulkhead Array connector that includes ferrules 62 containing a number of optic fibers 62. In the embodiment shown in FIGS. 3A and 6B, the optic adaptor 26 includes nine Bulkhead Array connectors 60, where each connector 60 includes six ferrules 64-1 through 64-6 and where each ferrule 64-1 through 64-6 contains twelve optic fibers 62-1 through 62-12. Each ferrule 64-1 through 64-6 is configured to optically couple with a particular ASIC on a corresponding line card 32. For example, in the embodiment shown, ferrules 64-1, 64-3, 64-4, and 64-6 couple to third-stage ASICs of a corresponding line card 32 via line card connectors 33 and operate to transmit data from the fabric card chassis 22 to the line card chassis 20. Also in the embodiment shown, ferrules 64-2 and 64-5 couple to first-stage ASICs of the corresponding line card 32 via line card connectors 33 and operate to transmit data from the line card chassis 20 to the fabric card chassis 22

The optic coupling 44 is configured to optically couple the first and second sets of connectors 50, 60. For example, the optic coupling 44 is configured as several twelve fiber ribbon cables that attach the optic fibers of the Bulkhead Array connector ferrules 64-1 through 64-6 with the optic fibers of the HBMT MB ferrules 54-1 through 54-4. The optic coupling 44, therefore, provides a one-to-one correspondence between the optic fibers of the opposed connector sets 50, 60.

Returning to FIGS. 3B and 4, the optic adaptor 26, in one arrangement, is configured to maintain electronic information that allows a particular adaptor 26 to be identified within the system 20. For example, each adaptor 26 can include an electronic storage mechanism (not shown), such as a serial EEPROM, that stores information related to the adaptor type, serial number, or revision number of the optic adaptor 26. The electronic storage mechanism can be accessed by a corresponding, interconnected fabric card 36 via connector 46.

Returning to FIG. 1, in one arrangement, the optic adaptors 26 allow the connection of multiple line card chassis 24 to the fabric card chassis 22. Such connection directs data entering the system 20 through a port associated with one line card chassis 24-1 to a corresponding fabric card 36 and allows the fabric card 36 to direct the data to a destination through a port associated with a second line card chassis 24-2.

Figure 7:
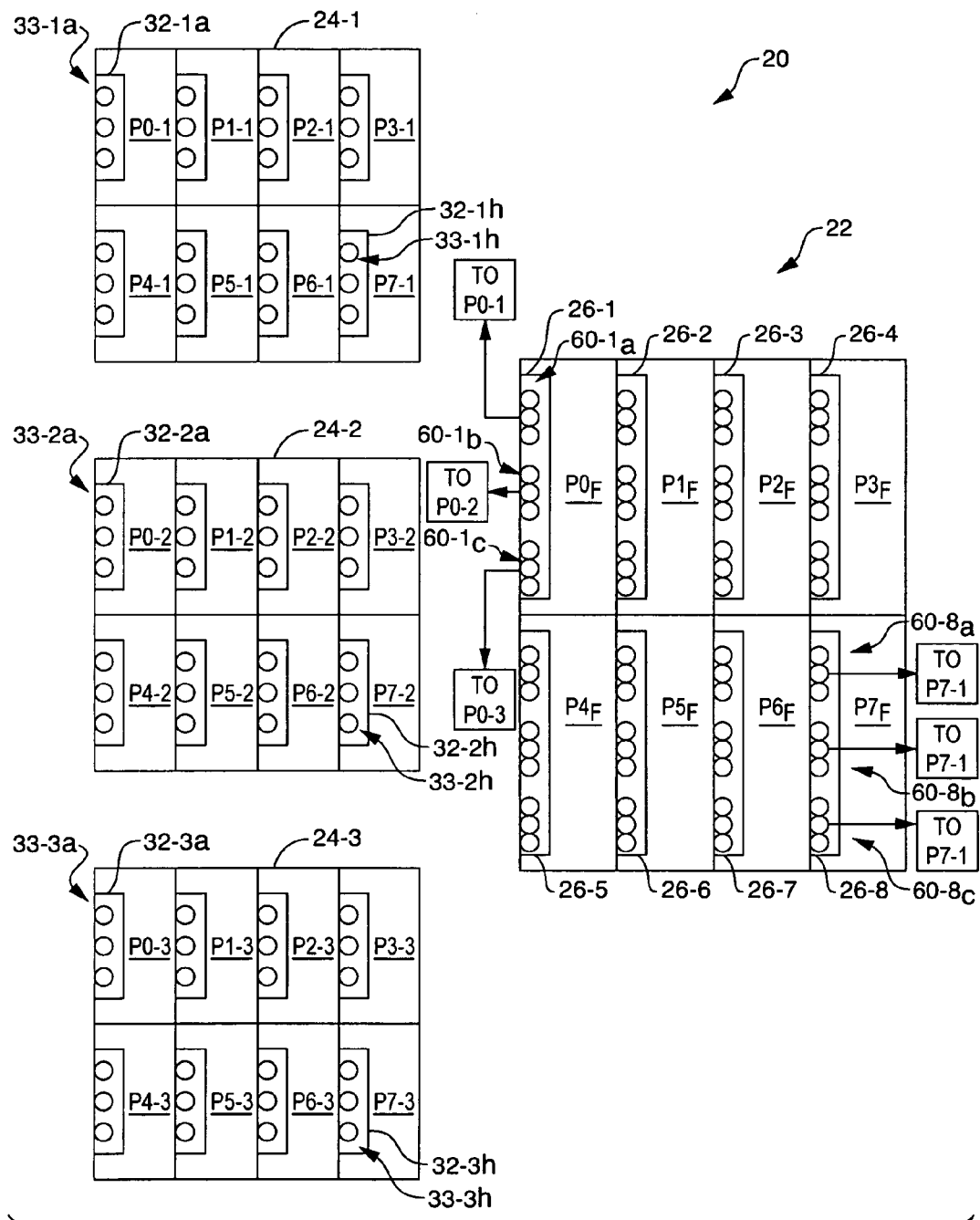
FIG. 7 illustrates a schematic representation of an embodiment of the data communications system of FIG. 1 having three line card chassis optically coupled to the fabric card chassis.

FIG. 7 illustrates an embodiment of the system 20 that includes three separate line card chassis 24-1, 24-2, and 24-3 and a fabric card chassis 22. Each line card chassis 24-1, 24-2, 24-3 includes eight line cards that represent eight distinct planes of the line card chassis 24. For example, the line card chassis 24-1 includes eight line cards that each represent eight planes P0-1 through P7-1 of the chassis 24-1, the line card chassis 24-2 includes eight line cards that each represent eight planes P0-2 through P7-2 of the chassis 24-2, and the line card chassis 24-3 includes eight line cards that each represent eight planes P0-3 through P7-3 of the chassis 24-3. The fabric card chassis 22 also includes eight planes $P0_F$ through $P7_F$ where each plane includes a corresponding fabric card 36 and optic adaptor 26-1 through 26-8. As shown, each optic adaptor includes nine Bulkhead Array connectors 60, grouped into three sets 60-1$a$, 60-1$b$, and 60-1$c$ of three connectors each.

In order to provide interconnection of the three line card chassis 24-1, 24-2, 24-3, each plane of each line card chassis 24 optically connects to a corresponding plane of the fabric card chassis 22 via an optic adaptor 26. For example, in plane $P0_F$ of the fabric card chassis 22, each connector 60 of the first set of three connectors 60-1$a$ of the optic module 26-1 optically couples with the line card connectors 33-1$a$ of the first plane P0-1 of the first line card chassis 24-1. Each connector 60 of the second set of connectors 60-1$b$ of the optic module 26-1 optically couples to the line card connectors 33-2$a$ located in the first plane P0-2 of the second line card chassis 24-2. Also, each connector 60 of the third set of connectors 60-1$c$ of the optic module 26-1 optically couple to the line card connectors 33-3$a$ located in the first plane P0-3 of the third line card chassis 24-3. The other planes $P1_F$ through $P7_F$ of the fabric card chassis 22 also optically couple to the corresponding planes P1 through P7 of the line card chassis 24-1, 24-2, 24-3 of the system 20 in the same manner.

With such optical coupling, each fabric card 36 in each plane of the fabric card chassis 22 can communicate with the line cards 32 located in corresponding planes for each of the line card chassis 24-1, 24-2, 24-3. For example, the fabric card of plane $P1_F$ of the fabric card chassis 22 communicates with line card 32-1$a$ of chassis 24-1, line card 32-2 of line card chassis 24-2 and line card 32-3$a$ of line card chassis 24-3, via the optic adaptor 26-1. In use, the fabric chassis 22 receives data from any of the line card chassis 24-1, 24-2, 24-3 in the system 20 via the optic adaptors 26 and can direct the data to a destination through ports associated with any of the line card chassis 24-1, 24-2, 24-3 connected thereto.

Figure 8:
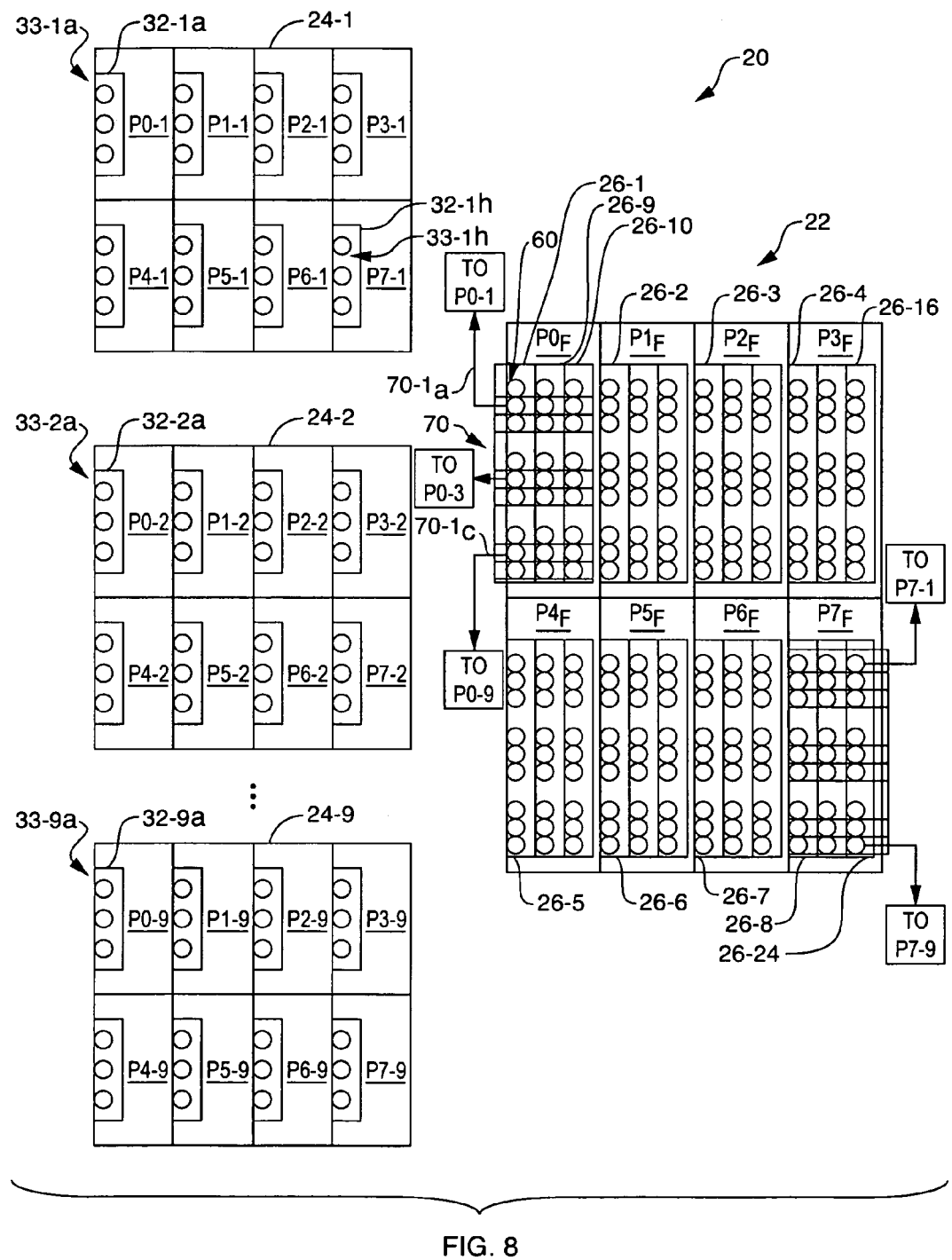
FIG. 8 illustrates a schematic representation of an embodiment of the data communications system of FIG. 1 having nine line card chassis optically coupled to the fabric card chassis.
Figure 9:
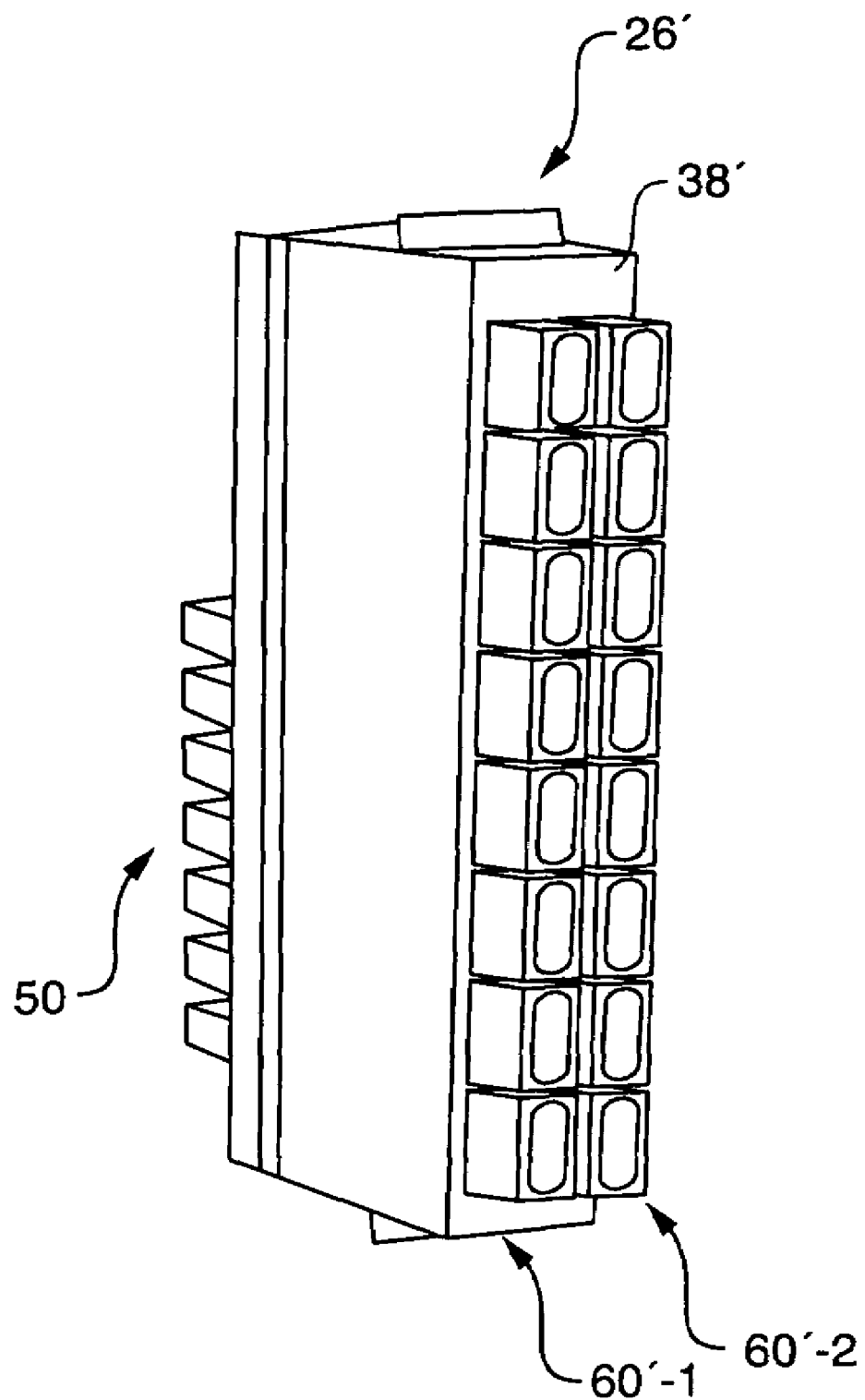
FIG. 9 illustrates a perspective view of an embodiment of an optic adaptor of FIG. 1, according to one embodiment of the invention.
Figure 11:
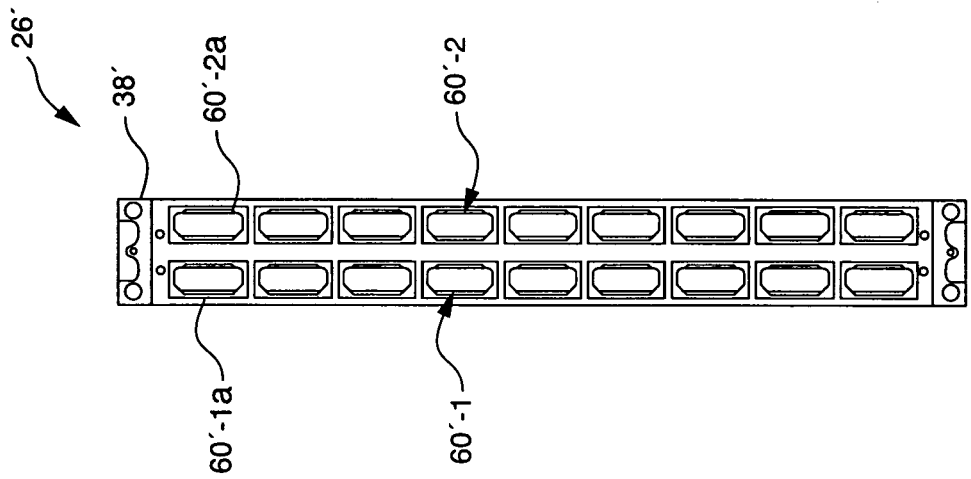
FIG. 11 illustrates a line card connector end view of the optic adaptor of FIG. 9.
Figure 10:
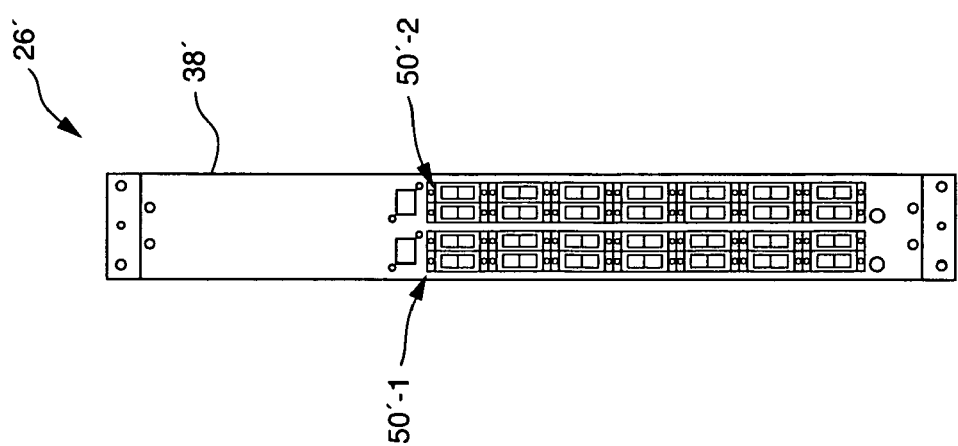
FIG. 10 illustrates a fabric card connector end view of the optic adaptor of FIG. 9.

Over time, additional line card chassis 24 can be introduced to the system 20 to increase the overall bandwidth of the system 20. In order to increase the number of line card chassis 24 that connect to the fabric card chassis 22, in one arrangement, additional fabric cards 36 and optic adaptors 26 can be added to the fabric card chassis 22. FIG. 8 illustrates a schematic representation of the fabric card chassis 24 having been upgraded from interconnecting three line card chassis 24-1, 24-2, 24-3, as shown in FIG. 7, to interconnecting an additional six line card chassis 24-4 through 24-9 for a total of nine line card chassis 24-1 through 24-9.

To increase the number of line card chassis 24 that connect to the fabric card chassis 22, additional fabric cards 36 and optic adaptors 26 are first optically coupled to the fabric card chassis 22. For example, in one arrangement, the fabric card chassis 22 can accommodate up to twenty-four fabric cards 36. In the case where each fabric plane $P0_F$ through $P7_F$ of the fabric chassis 22 includes one corresponding fabric card 36 and optic adaptor 26, such as optic adaptors 26-1 through 26-8 as illustrated in FIG. 7, up to sixteen additional fabric cards 36 and optic adaptors 26 can be optically connected to the fabric card chassis 22. For example, as illustrated in FIG. 8, two additional fabric cards 36 and corresponding optic adaptors 26 have been added to each plane $P0_F$ through $P7_F$ of the fabric card chassis 22.

With the addition of the fabric cards 36 and optic adaptors 26-9 through 26-24 to the fabric card chassis 22, additional line card chassis 24 can be connected to the fabric card chassis 22. For example, as illustrated in FIG. 8, up to nine line card chassis 24-1 through 24-9 can be connected to the fabric card chassis 22. To provide such connection, in one arrangement, each plane P0 through P7 of each line card chassis 24-1 through 24-9 optically attaches to a corresponding plane P0 through P7 of the fabric card chassis 22 via the optic adaptors 26.

Taking plane $P0_F$ of the fabric card chassis 22 as an example, plane $P0_F$ includes three fabric cards (not shown) and correspondingly connected optic adaptors 26-1, 26-9, and 26-10 where each optic adaptor 26-1, 26-9, and 26-10 includes nine connectors 60. When mounted to plane $P0_F$ of the fabric card chassis 22 in a side-by-side configuration as shown, the connectors 60 of the three optic adaptors 26-1, 26-9, and 26-10 form nine rows 70-1$a$ through 70-1$i$ of connectors. Each row of connectors 70 of the P0 plane of the line card chassis 22 then optically connects to a corresponding P0 plane for each of the line card chassis 24. For example, the connectors of row 70-1$a$ can be optically coupled to the connectors 33-1$a$ of the line card 32-1$a$ in plane P0-1 of line card chassis 24-1, the connectors of row 70-1$b$ can be optically coupled to the connectors 33-2$a$ of the line card 32-2$a$ in plane P0-1 of line card chassis 24-2, etc. Such connection continues up to the connectors of row 70-1$i$ with the connectors 33-9$a$ of the line card 32-9$a$ in plane P0-1 of line card chassis 24-9. Additionally, the other planes $P1_F$ through $P7_F$ of the fabric card chassis 22 also optically couple to the corresponding planes P1 through P7 of the line card chassis 24-1 through 24-9 in the same manner. In such a configuration, each optic adaptor 26 of each fabric plane $P0_F$ through $P7_F$ allows transmission of a signal from any connected line card chassis 24-1 through 24-9 to its associated fabric card 36 and allows the fabric card 36, in turn, to transmit the signal to any of the connected line card chassis 24-1 through 24-9 for delivery to a destination.

In one embodiment, as additional fabric cards 36 and optic adaptors 26 are added to the fabric card chassis 22 to allow connection of additional line card chassis 24-4 through 24-9 to the system 20, the fabric card chassis 22 maintains communication with existing line card chassis 24 connected thereto. For example, as additional fabric cards 36 and optic adaptors 26 are added to the fabric chassis 22, shown in FIG. 7, for the connection of additional line card chassis (e.g., chassis 24-4 through 24-9) the fabric card chassis 22 maintains communication with the initially connected chassis 24-1 through 24-3. In such an arrangement, the system 20 maintains service to user devices while the bandwidth of the system is upgraded by the connection of additional line card chassis.

As illustrated above, the "single-space" optic module 26 allows the connection of up to nine line card chassis 24-1 through 24-9 to a single fabric card chassis 22. The optic module 26, however, can be configured to allow the connection of more than nine line card chassis 24 to the fabric card chassis 22.

FIGS. 9-13 illustrate an embodiment of an optic adaptor 26' having a housing 38', two sets of fabric card connectors 50'-1, 50'-2 and two sets of line card connectors 60'-1, 60'-2. Such a configuration allows the optic adaptor 26' to connect to two fabric cards 36-1 of the fabric card chassis 22 and allows the connection of up to eighteen line card chassis 24 to the fabric card chassis 22.

The housing 38' is configured to support the first and second sets of connectors 50, 60. In one arrangement, as shown, the housing 38' is configured as a "double-space" housing configured to be inserted within two rack spaces within the fabric card chassis 22. As such, the housing 38 allows coupling of the optic adaptors 26 with two corresponding fabric cards 36-1, 36-2 of the fabric card chassis 22.

The fabric card connectors of each set 50'-1, 50'-2 are adapted to removeably couple to receptacles of corresponding fabric cards 36-1, 36-2. For example, each set 50'-1, 50'-2 of connectors includes fourteen HBMT Mother Board connectors which can optically couple with corresponding receptacles of the fabric cards 36-1, 36-2. Each of the line card connectors 60'-1, 60'-2 are adapted to removeably couple to corresponding line card connectors 33 of a line card chassis 24. For example, each set 60'-1, 60'-2 of connectors includes nine Bulkhead Array connectors. The (e.g., Bulkhead Array) that can connect to line card connectors 33 via optic cable 68.

Figure 12:
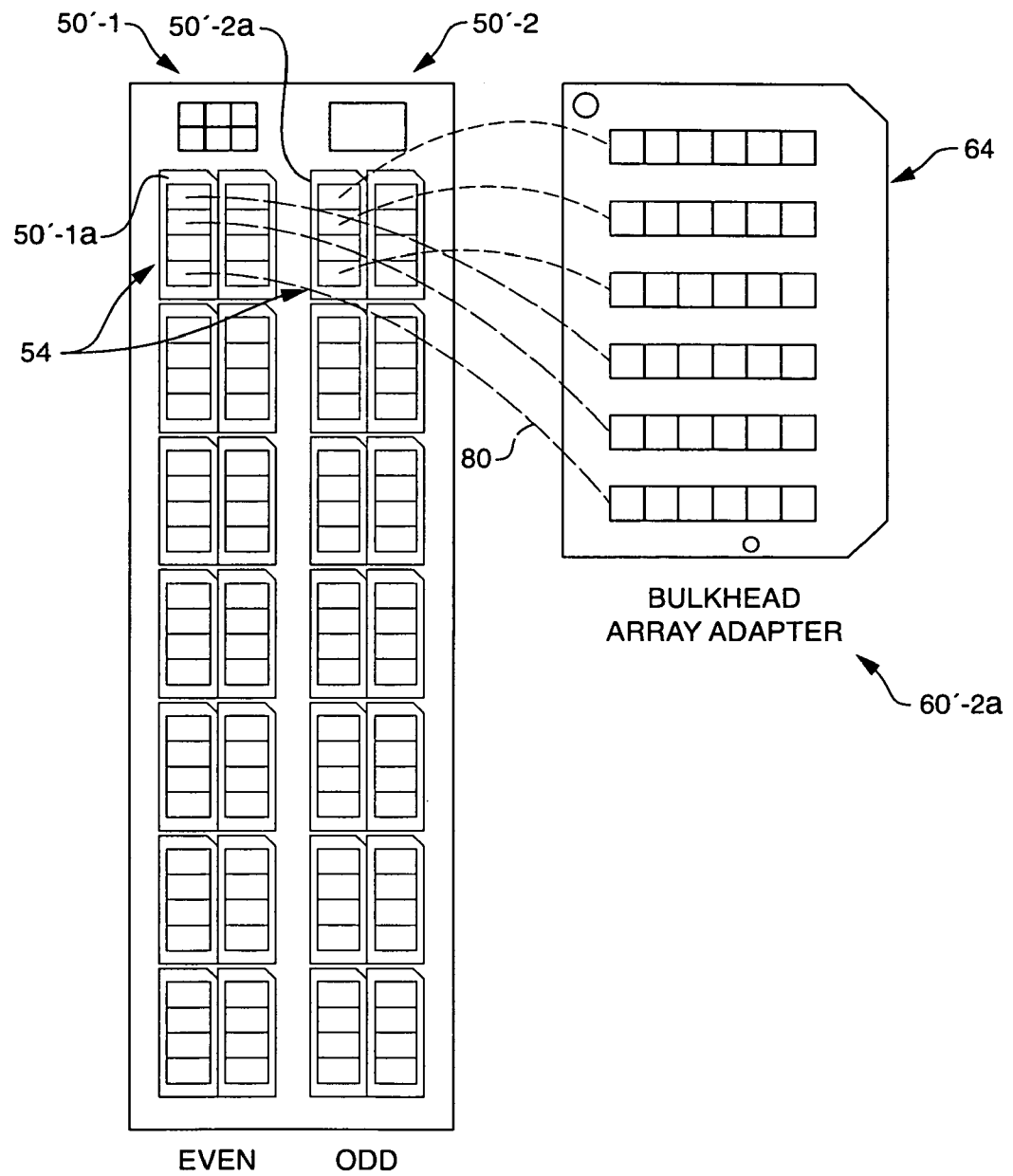
FIG. 12 illustrates a schematic representation of an optic connector coupling a line card connector and fabric card connectors of the optic adaptor of FIG. 9.

The housing 38' contains an optic coupling configured to optically connect the fabric card connectors 50'-1, 50'-2 and the line card connectors 60'-1, 60'-2 to allow transmission of signals therebetween. For example, the optical coupling connects each line card connector 60 of each set of connectors 60'-1, 60'-2 to a fabric card connector of the first set of connectors 50'-1 and to a fabric card connector of the second set of connectors 50'-2. In particular, FIG. 12 illustrates an optic connector 80 disposed between a line card connector 60'-2a and the first and second sets of fabric card connectors 50'-1, 50'-2 where the optic connector 80 couples the ferrules 64 of the line card connector 60'-2a with ferrules 54 of a connector 50'-1a of the first set of connectors 50'-1 and with ferrules 54 of a connector 50'-2a of the second set of connectors 50'-2. Additionally, the housing 38' also includes additional optic connectors (not shown) that optically couple the remaining a line card connectors in the first and second sets of connectors 60'-1, 60'-2 with the fabric card connectors 50'-1, 50'-2.

Figure 13:
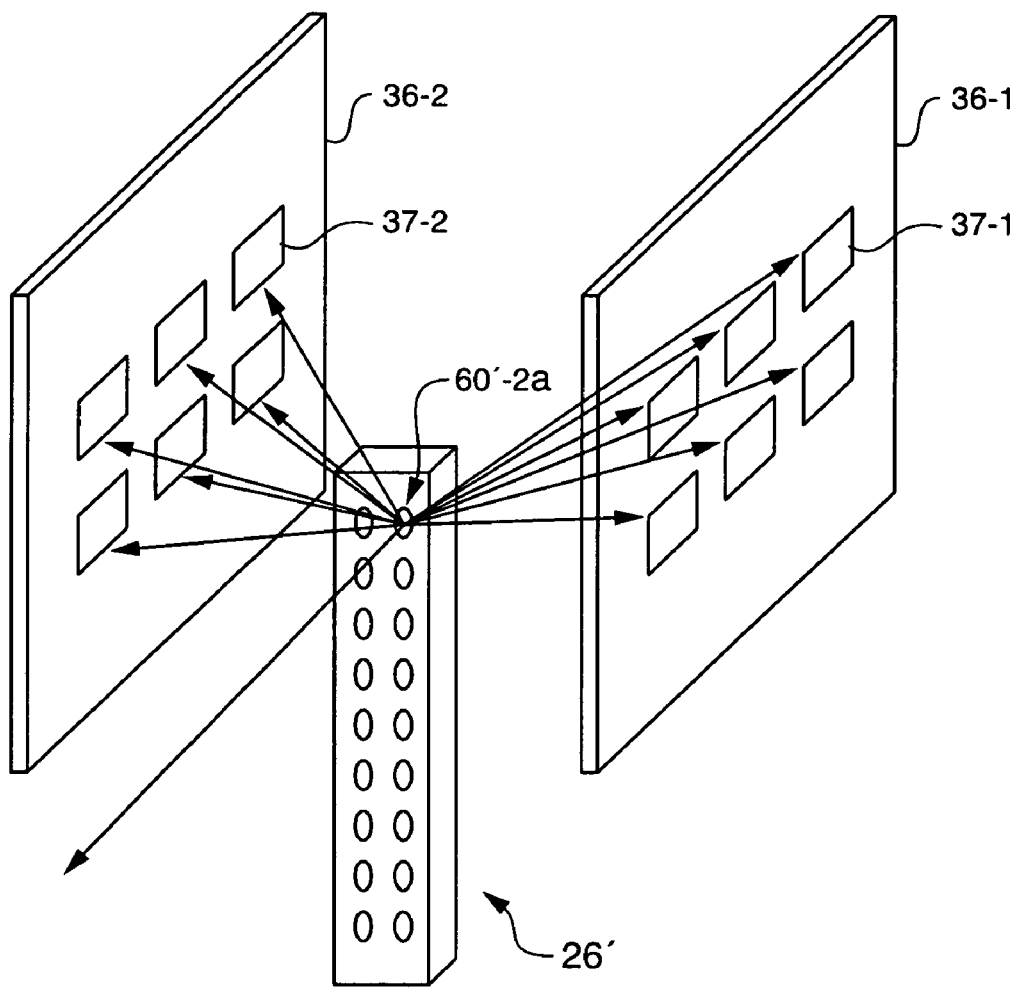
FIG. 13 illustrates signal distribution from the optic adaptor of FIG. 9 to corresponding fabric cards according to one embodiment of the invention.

As a result of such coupling via the optic connectors 80, as indicated in FIG. 13, as the optic adaptor 26' receives signals from a line card chassis 24, such as by line card connector 60'-2a, the optic connector 80 can deliver the signal to either fabric card connector 50'-1a or fabric card connector 50'-2a for delivery to the first fabric card 36-1 or second fabric card 36-2, respectively. Either fabric card 36-1, 36-2 can then process the signal via the second stage ASICs 37-1, 37-2, respectively, and transmit the processed signal through any of the line card connectors in either set 60'-1, 60'-2 of connectors to any line card chassis 24 within the system 20 connected to the optic adaptor 26'.

The optic adaptor 26' shown in FIGS. 9-13B can be used to upgrade a fabric card chassis 22, such as illustrated in FIG. 7, to allow the connection of additional line card chassis 24 to the system 20 to increase the system's bandwidth. During the upgrade procedure, for example, a fabric card chassis 22 is initially provided having at least one fabric card 36 and a corresponding optic adaptor 26 optically coupled to the fabric card 36. The first optic adaptor 26 includes a first set of pathways configured to carry a signal between the fabric card 36 and each line card chassis 24 of a first plurality of line card chassis 24. For example, as shown in FIG. 7, the fabric card chassis 22 includes eight planes $P0_F$ through $P7_F$ where each plane includes a fabric card 36 and a corresponding optic adaptor 26. As indicated above, the optic adaptor 26 includes optic pathways, such as optic couplings 44, which interconnect the line card connectors 60 with the fabric card connectors 50. These optic couplings allow each fabric card 36 of each plane P0 through P7 to connect with up to three line card chassis 24-1, 24-2, 24-3 in the system 20.

Next, each optic adaptor 26 is decoupled from each fabric card 36. For example, a user engages the latches 56 on the line card connectors 50 to disengage each optic adaptor 26 from each fabric card 36. As such, an optic coupling is maintained between the fabric card 36 and the fabric card chassis 22 and. The user then removes each "single-space" optic adaptor 26 from the fabric card chassis 22 and inserts optic adaptors 26' such as illustrated in FIGS. 9-13, into the line card chassis 22. During insertion, each optic adaptor 26' optically couples to at least two fabric cards 36-1, 36-2 of the fabric card chassis 22. For example, the line card connectors 50'-1, 50'-2 blind mate with corresponding receptacles of the fabric cards 36.

Figure 14A:
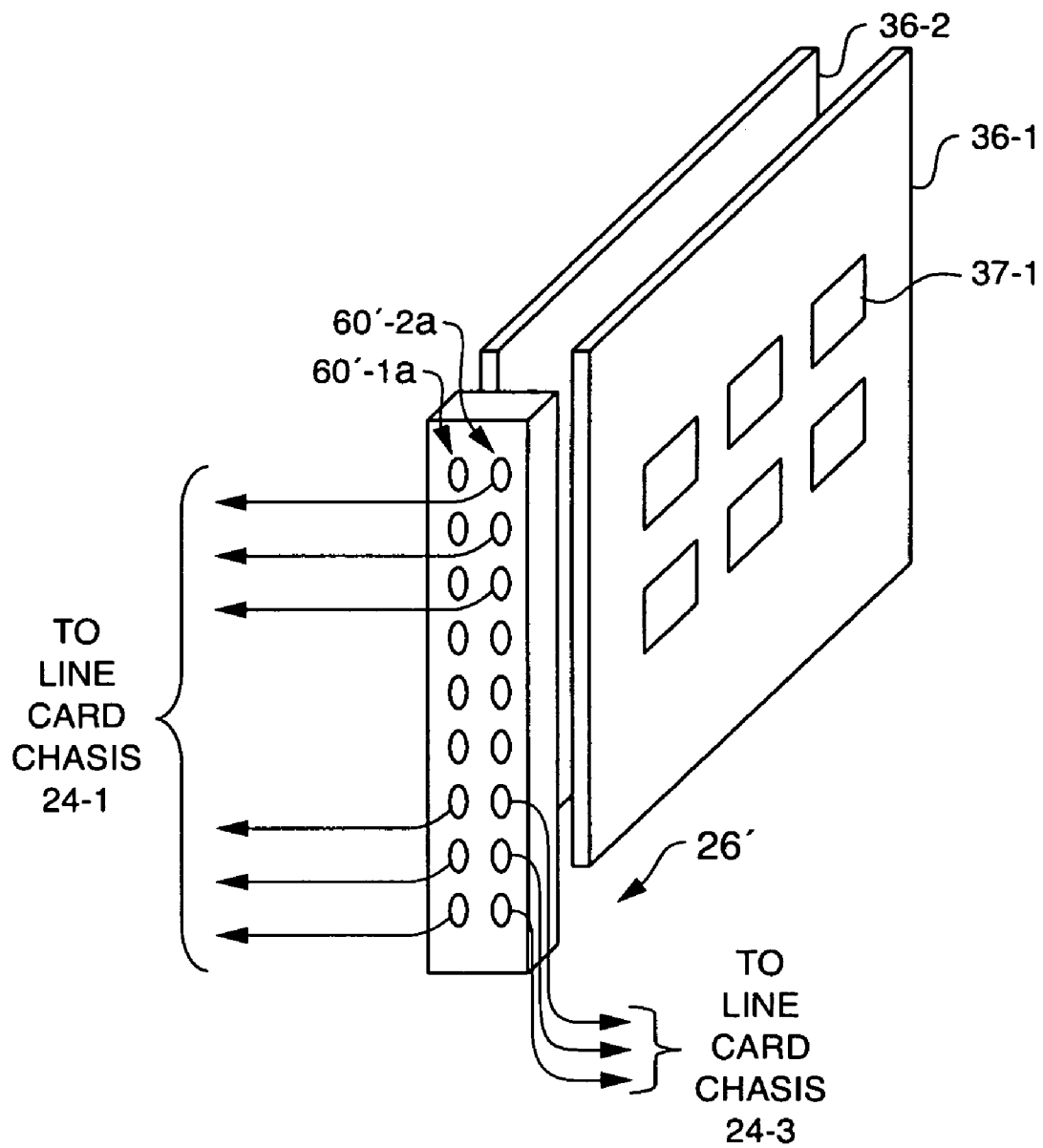
FIG. 14A illustrates an embodiment of the optic adaptor of FIG. 9 adapted to provide optical connection between a fabric card chassis an up to six line card chassis.
Figure 14B:
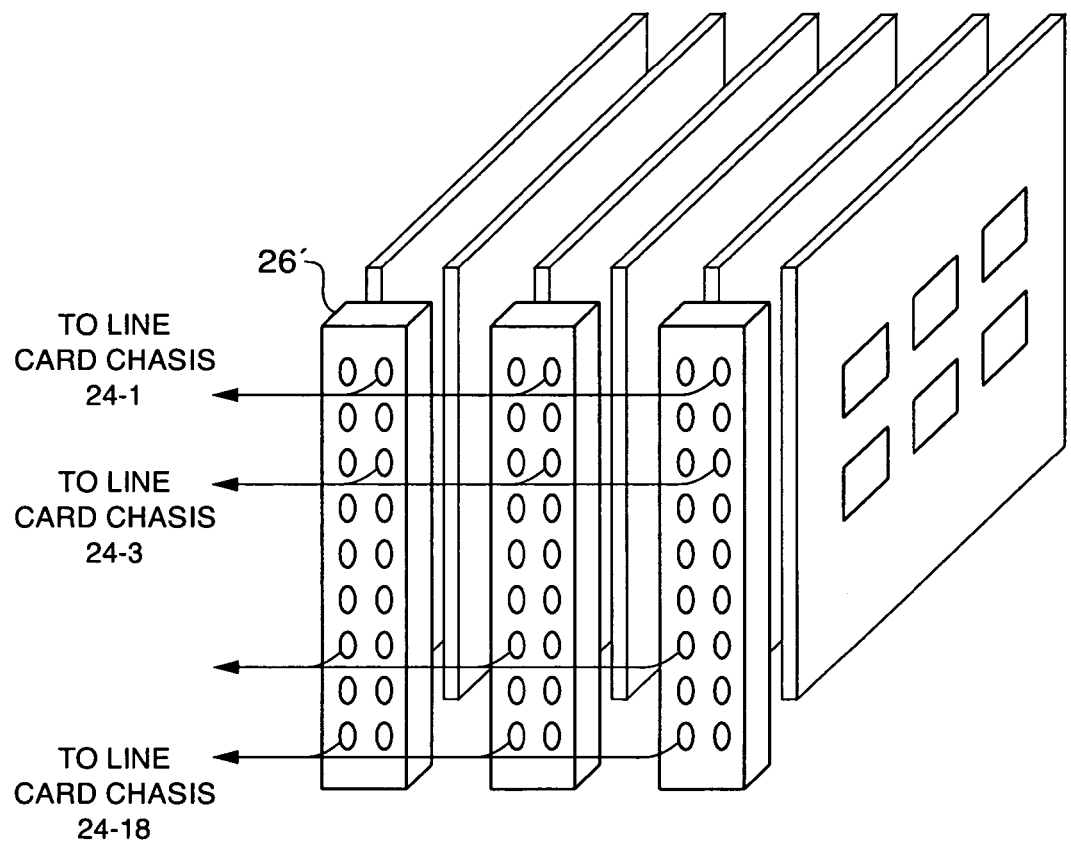
FIG. 14B illustrates an embodiment of the optic adaptor of FIG. 9 adapted to provide optical connection between a fabric card chassis an up to eighteen line card chassis.

The optic adaptor 26' includes pathways, such as optic connectors 80, that can carry a signal from any line card connector 60' to either of the fabric cards 36-1, 36-2 and from either of the two fabric cards 36-1, 36-2 to any line card chassis 24-1, 24-2, 24-3 of the first plurality of line card chassis and any line card chassis of a second plurality of line card chassis. For example, as illustrated in FIG. 14A the optic adaptor 26' is adapted to connect to six line card chassis 24 such that a first set of line card connectors 60'-2a couple to the initial three line card chassis in the system 20, as shown in FIG. 7 and the second set of line card connectors 60'-1a couple to an additional three line card chassis added to the system 20. In another example, as illustrated in FIG. 14B, the optic adaptor 26' is adapted to connect to up to eighteen line card chassis 24 such that each connector 60' of the first set and second set of connectors 60'-1, 60'-2 can couple to a corresponding one of eighteen line card chassis of the system 20.

As described above, during an upgrade procedure, "single-space" optic modules 26 are removed from the fabric card chassis 22 and replaced with modules, such as "double space" optic modules 26' to increase the number of line card chassis connections 60 in the fabric card chassis 22. In one embodiment, the optic modules 26 in the fabric card chassis 22 are upgraded during operation of the fabric card chassis 22. For example, as illustrated in FIG. 7, the fabric card chassis 22 includes fabric planes P0 through P7 where each fabric plane includes a fabric card 36 and corresponding optic adaptor 26 where each optic adaptor carries signals between the fabric card 36 of its fabric plan and the corresponding fabric planes of the connected line card chassis 24. During the upgrade procedure, the optic adaptors 26 of each fabric card chassis plane P0 are upgraded in a serial manner such that, while one plane P0 of the fabric card chassis 22 is non-operative because of the upgrade, the other remaining seven planes P1 through P7 continue to transmit and receive data relative to the line card chassis within the system 20. As a result, the system 20 provides substantially continuous service to end user devices, for example.

While this invention has been particularly shown and described with references to preferred embodiments thereof, it will be understood by those skilled in the art that various changes in form and details may be made therein without departing from the spirit and scope of the invention as defined by the appended claims.

For example, as described above, in the case where a fabric card chassis 22, such as shown in FIGS. 7 and 8, includes "single-space" optic adaptors 26 which provide connection to up to nine line card chassis 24, the optic adaptors 26 can be can be replaced with "double space" optic adaptors 26' which provide connection to up to eighteen line card chassis 24. Such description is by way of example only. The optic module can be configured o allow connection of any number of line card chassis 24 to the fabric card chassis 22.

Figure 15:
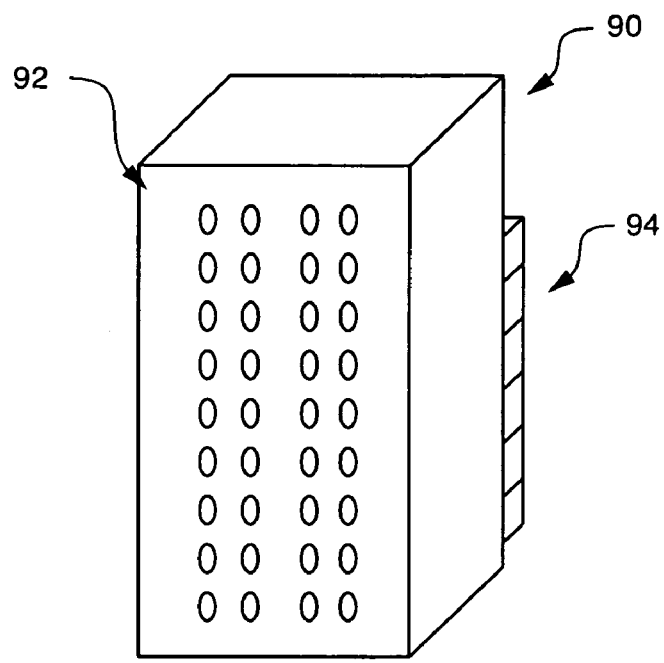
FIG. 15 illustrates an embodiment of an optic adaptor configured to provide optical connection between a fabric card chassis an up to thirty-six line card chassis.

FIG. 15 illustrates an embodiment of an optic adaptor 90 having thirty-six line card connectors 92 and fifty-six fabric card connectors 94. The fabric card connectors 94 can optically couple with up to four fabric cards 36 of the fabric card chassis 22 while the line card connectors 92 can optically couple with up to thirty-six line card chassis 24. The optic adaptor 90 also includes pathways (not shown) that are configured to carry a signal between any of the thirty-six attached line card chassis and any of the four attached fabric cards 36.

Figure 16:
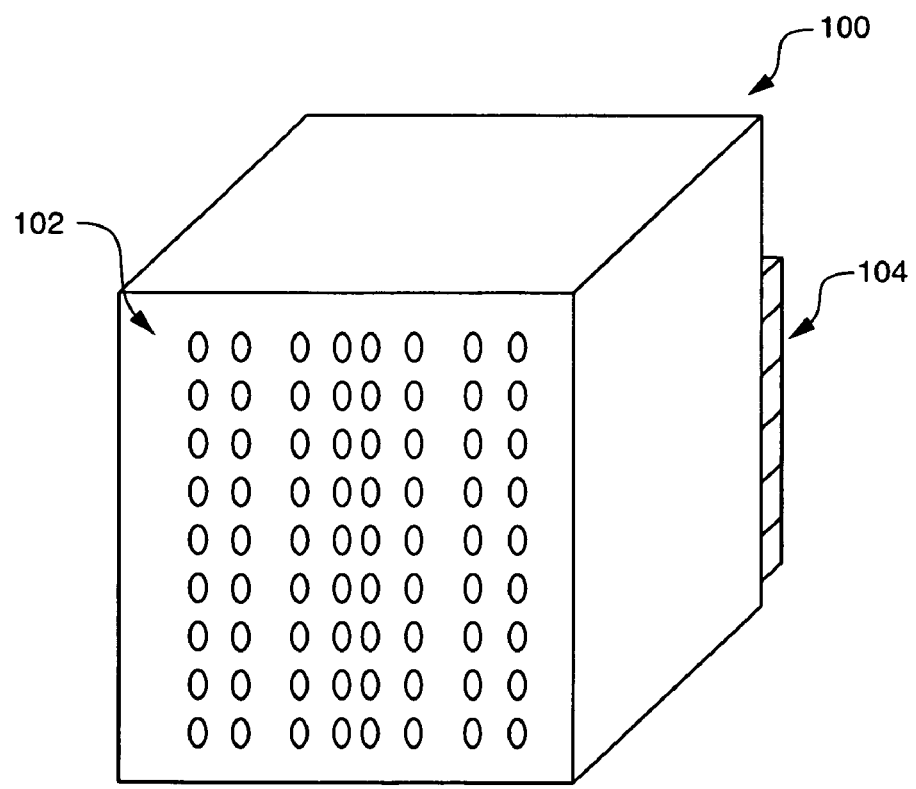
FIG. 16 illustrates an embodiment of an optic adaptor configured to provide optical connection between a fabric card chassis an up to seventy-two line card chassis.

FIG. 16 illustrates an embodiment of an optic adaptor 100 having seventy-two line card connectors 102 and one hundred twelve fabric card connectors 104. The fabric card connectors 104 can optically couple with up to eight fabric cards 36 of the fabric card chassis 22 while the line card connectors 102 can optically couple with up seventy-two line card chassis 24. The optic adaptor 100 also includes pathways (not shown) that are configured to carry a signal between any of the seventy-two attached line card chassis and any of the eight attached fabric cards 36.

What is claimed is:

1. A method for interconnecting line card chassis of a data communications system, comprising:
   providing a fabric card chassis having a set of fabric cards and a first optic adaptor optically coupled to a corresponding fabric card of the set of fabric cards, the first optic adaptor having a first set of pathways configured to carry a signal between the fabric card and each line card chassis of a first plurality of line card chassis;
   removing the first optic adaptor from the fabric card chassis to optically decouple the first optic adaptor from the corresponding fabric card of the set of fabric cards; and
   attaching a second optic adaptor to the fabric card chassis to optically couple the second optic adaptor to at least two fabric cards of the set of fabric cards of the fabric card chassis, the second optic adaptor being distinct from the first optic adaptor and the second optic adaptor having a second set of pathways configured to carry a signal between the at least two fabric cards of the set of fabric cards and any line card chassis of the first plurality of line card chassis and any line card chassis of a second plurality of line card chassis.

2. The method of claim 1, wherein removing the first optic adaptor from the fabric card chassis to optically decouple the first optic adaptor from the corresponding fabric card of the set of fabric cards comprises removing the first optic adaptor from the fabric card chassis to optically decouple the first optic adaptor from the corresponding one fabric card of the set of fabric cards while maintaining a coupling between the fabric card chassis and the corresponding one fabric card of the set of fabric cards.

3. The method of claim 1, wherein attaching the second optic adaptor to the fabric card chassis to optically couple the second optic adaptor to the at least two fabric cards of the set of fabric cards of the fabric card chassis comprises attaching the second optic adaptor to the fabric card chassis to optically couple the second optic adaptor to two fabric cards of the set of fabric cards of the fabric card chassis, the second optic adaptor having the second set of pathways configured to carry a signal between the at least two fabric cards and any six line card chassis of the first plurality of line card chassis and the second plurality of line card chassis.

4. The method of claim 1, wherein attaching the second optic adaptor to the fabric card chassis to optically couple the second optic adaptor to the at least two fabric cards of the set of fabric cards of the fabric card chassis comprises attaching the second optic adaptor to the fabric card chassis to optically couple the second optic adaptor to two fabric cards of the set of fabric cards of the fabric card chassis, the second optic adaptor having the second set of pathways configured to carry a signal between the two fabric cards and any eighteen line card chassis of the first plurality of line card chassis and the second plurality of line card chassis.

5. The method of claim 1, wherein attaching the second optic adaptor to the fabric card chassis to optically couple the second optic adaptor to the at least two fabric cards of the set of fabric cards of the fabric card chassis comprises attaching the second optic adaptor to the fabric card chassis to optically couple the second optic adaptor to four fabric cards of the fabric card chassis, the second optic adaptor having the second set of pathways configured to carry a signal between the four fabric cards and any thirty-six line card chassis of the first plurality of line card chassis and the second plurality of line card chassis.

6. The method of claim 1, wherein attaching the second optic adaptor to the fabric card chassis to optically couple the second optic adaptor to the at least two fabric cards of the set of fabric cards of the fabric card chassis comprises attaching the second optic adaptor to the fabric card chassis to optically couple the second optic adaptor to eight fabric cards of the set of fabric cards of the fabric card chassis, the second optic adaptor having the second set of pathways configured to carry a signal between the eight fabric cards and any seventy-two line card chassis of the first plurality of line card chassis and the second plurality of line card chassis.

7. The method of claim 1, wherein:
   providing the fabric card chassis comprises providing the fabric card chassis having a plurality of fabric planes, each fabric plane having a fabric card and a corresponding optic adaptor optically coupled to the fabric card, each of the optic adaptors having a set of pathways configured to carry a signal between each of the fabric planes of the fabric card chassis and each line card chassis of the first plurality of line card chassis; and
   removing the first optic adaptor from the fabric card chassis to optically decouple the first optic adaptor from the corresponding fabric card of the set of fabric cards comprises removing the first optic adaptor from the fabric card chassis to optically decouple the optic adaptor from the corresponding fabric card of the set of fabric cards in one of the plurality of fabric planes of the fabric chassis while maintaining the optical connection between each remaining optic adaptor and corresponding fabric card in the remaining plurality of fabric planes.

8. The method of claim 1, wherein attaching the second optic adaptor to the fabric card chassis to optically couple the second optic adaptor to the at least two fabric cards of the set of fabric cards of the fabric card chassis comprises attaching the second optic adaptor to the fabric card chassis to optically couple the second optic adaptor to the at least two fabric cards of the set of fabric cards, the at least two fabric cards being disposed in adjacent rack spaces in a side-by-side manner within the fabric card chassis.

9. The method of claim 8, wherein:
providing the fabric card chassis having the set of fabric cards and the first optic adaptor optically coupled to the corresponding fabric card of the set of fabric cards, the first optic adaptor having the first set of pathways configured to carry the signal between the fabric card and each line card chassis of the first plurality of line card chassis comprises providing the fabric card chassis having the set of fabric cards and the first optic adaptor optically coupled by HBMT Mother Board connectors to corresponding receptacles of the corresponding fabric card of the set of fabric cards, the first optic adaptor having the first set of pathways configured to carry the signal between the fabric card and each line card chassis of the first plurality of line card chassis via a first set of Bulkhead Array connectors; and
attaching the second optic adaptor to the fabric card chassis to optically couple the second optic adaptor to at least two fabric cards of the set of fabric cards of the fabric card chassis, the second optic adaptor having the second set of pathways configured to carry the signal between the at least two fabric cards of the set of fabric cards and any line card chassis of the first plurality of line card chassis and any line card chassis of the second plurality of line card chassis comprises attaching the second optic adaptor to the fabric card chassis to optically couple the second optic adaptor, via HBMT Mother Board connectors, to corresponding receptacle of at least two fabric cards of the set of fabric cards of the fabric card chassis, the second optic adaptor having the second set of pathways configured to carry a signal between the at least two fabric cards of the set of fabric cards and any line card chassis of the first plurality of line card chassis and any line card chassis of a second plurality of line card chassis via a second set of Bulkhead Array connectors.

10. The method of claim 1, wherein removing the first optic adaptor from the fabric card chassis to optically decouple the first optic adaptor from the corresponding fabric card of the set of fabric cards further comprises replacing the first optic adaptor with the second optic adaptor, the second optic adaptor being distinct from the first optic adaptor.

* * * * *